(12) United States Patent
He et al.

(10) Patent No.: US 11,188,801 B2
(45) Date of Patent: Nov. 30, 2021

(54) METHOD AND APPARATUS FOR FUSING OBJECT INTO PANORAMIC VIDEO

(71) Applicants: Bejing Jingdong Shangke Information Technology Co., Ltd., Bejing (CN); Bejing Jingdong Century Trading Co., Ltd., Bejing (CN)

(72) Inventors: Jinping He, Beijing (CN); Gang Zhao, Beijing (CN); Wenbo Li, Beijing (CN); Bi Peng, Beijing (CN)

(73) Assignees: Beijing Jingdong Shangke Information Technology Co., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 68 days.

(21) Appl. No.: 16/628,132

(22) PCT Filed: Jul. 4, 2018

(86) PCT No.: PCT/CN2018/094519
§ 371 (c)(1),
(2) Date: Jan. 2, 2020

(87) PCT Pub. No.: WO2019/007370
PCT Pub. Date: Jan. 10, 2019

(65) Prior Publication Data
US 2020/0387740 A1    Dec. 10, 2020

(30) Foreign Application Priority Data
Jul. 4, 2017   (CN) .......................... 201710537524.8

(51) Int. Cl.
*G06K 9/62* (2006.01)
*G06K 9/46* (2006.01)
*G06T 3/40* (2006.01)

(52) U.S. Cl.
CPC ........... *G06K 9/629* (2013.01); *G06K 9/4652* (2013.01); *G06K 9/4661* (2013.01); *G06T 3/4038* (2013.01)

(58) Field of Classification Search
CPC ...... A63F 13/327; A63F 13/213; A63F 13/25; A63F 13/32; A63F 13/332; A63F 13/33;
(Continued)

(56) References Cited

U.S. PATENT DOCUMENTS 7,693,702 B1   4/2010  Kerner et al.
2016/0050368 A1*  2/2016  Seo .................... H04N 5/23238
348/36

FOREIGN PATENT DOCUMENTS

CN   101588482 A   11/2009
CN   105844256 A   8/2016

OTHER PUBLICATIONS

"3ds Max modeling and animation", Second Edition, Chapter 8.

* cited by examiner

*Primary Examiner* — Duy M Dang
(74) *Attorney, Agent, or Firm* — Dinsmore & Shohl LLP (57) ABSTRACT

Disclosed are method and apparatus for fusing an object into a panoramic video. The method may include: playing a panoramic video in a panoramic video player; obtaining a target object; parsing the target object to obtain a coordinates parameter and a material parameter of the target object; setting the color of each pixel of the target object when the target object is fused into the panoramic video according to the coordinate parameter and the material parameter, so as to obtain a colored target object; and fusing the colored target object into the panoramic video.

19 Claims, 5 Drawing Sheets

(58) Field of Classification Search
CPC .......... A63F 13/655; A63F 13/00; G06T 7/55;
G06T 3/0068; G06T 15/04; G06T 7/001;
G06T 7/593; G06T 7/85; G06T 7/73;
G06T 2207/10024; G06T 11/40; G06T
2207/20228; G06T 2207/30201; G06T
2207/10021; G06K 9/00228; G06K
9/6202; G06K 9/6279; G01S 13/90; G01S
17/89; H04N 13/128; H04N 13/194;
H04N 2013/0081
See application file for complete search history.

METHOD AND APPARATUS FOR FUSING OBJECT INTO PANORAMIC VIDEO

CROSS-REFERENCE TO RELATED APPLICATIONS

This application is a national stage of International Application No. PCT/CN2018/094519, filed on Jul. 4, 2018, which claims priority to Chinese Patent Application No. 201710537524.8, filed on Jul. 4, 2017, the contents of which are incorporated herein by reference in their entireties.

TECHNICAL FIELD

The present disclosure relates to the field of video playback, specifically to the field of panoramic video playback, and more specifically to a method and apparatus for fusing an object into a panoramic video.

BACKGROUND

A panoramic video refers to a playable video resource that has a plurality of playback angles of view, provides a user with an immersive experience and is similar to a real stereo scenario. Specifically, a panoramic video may be made and formed in many different ways, for example, a video or an image is formed by stitching continuous pictures of multiple angles. When viewing a panoramic video via a panoramic video player, the user can view at different angles of view by adjusting the upper and lower, left and right portions of the video. With the development of panoramic video playback technology, more and more fields have begun to use panoramic videos, including the fields of live broadcast, special effects of films and televisions, virtual games, etc.

The existing panoramic video playback technology can well restore the 720-degree panoramic effect of a panoramic video, but the technology can only play the content of the panoramic video, but cannot fuse other contents while playing the panoramic video.

SUMMARY

The objective of the present disclosure is to provide a method and device for fusing an object into a panoramic video, so as to solve the technical problems mentioned in the above background section.

According to a first aspect, some embodiments of the present provide a method for fusing an object into a panoramic video, the method includes: playing a panoramic video in a panoramic video player; acquiring a target object; parsing the target object, to obtain a coordinate parameter and a material parameter of the target object; setting, based on the coordinate parameter and the material parameter, a color of each pixel of the target object when the target object is fused into the panoramic video, to obtain a colored target object; and fusing the colored target object into the panoramic video.

In some embodiments, the playing a panoramic video in a panoramic video player includes: acquiring sequence frames of the panoramic video; mapping the sequence frames to an inner surface of a preset panoramic video playing model; and projecting a portion of the panoramic video playing model corresponding to a viewing interface onto a projection surface, to play the panoramic video.

In some embodiments, the setting, based on the coordinate parameter and the material parameter, the color of each pixel of the target object when the target object is fused into the panoramic video, to obtain the colored target object includes: determining, based on the coordinate parameter, two-dimensional coordinates corresponding to the target object projected onto the projection surface; determining, based on the material parameter, a reflection coefficient of the target object for light; and determining the color of the each pixel of the target object when the target object is fused into the panoramic video, based on the two-dimensional coordinates, the reflection coefficient, a preset intensity of ambient light and a preset intensity of directional light.

In some embodiments, the determining, based on the material parameter, a reflection coefficient for light of the target object includes: determining the reflection coefficient of the target object for light according to a preset list of correspondence between material parameters and reflection coefficients and the material parameter.

In some embodiments, the determining the color of each pixel of the target object when the target object is fused into the panoramic video, based on the two-dimensional coordinates, the reflection coefficient, the preset intensity of ambient light and the preset intensity of directional light includes: determining, based on the two-dimensional coordinates, a coordinate of the each pixel of the target object when the target object is fused into the panoramic video; determining an illumination intensity on the each pixel of the target object when the target object is fused into the panoramic video, based on the coordinate of the each pixel, the reflection coefficient and the preset intensity of ambient light and the preset intensity of directional light; and determining the color of the each pixel based on the illumination intensity on the each pixel.

In some embodiments, the fusing the colored target object into the panoramic video includes: acquiring position coordinates of the target object in the panoramic video; processing the colored target object, the processing including at least one of: scaling, translating, or rotating; and positioning the processed target object based on the position coordinates.

In some embodiments, the method further includes: acquiring sensor data of the panoramic video player; determining, based on the sensor data, whether the orientation of the panoramic video player intersects with the position coordinates; and counting, in response to the orientation of the panoramic video player intersecting with the position coordinates, a duration of the intersecting; and displaying a preset interactive interface when the duration is greater than a preset threshold.

According to a second aspect, some embodiments of the present disclosure provide an apparatus for fusing an object into a panoramic video, the apparatus includes: a panoramic video playing unit, configured to play a panoramic video in a panoramic video player; a target object acquiring unit, configured to acquire a target object; a target object parsing unit, configured to parse the target object to obtain a coordinate parameter and a material parameter of the target object; a target object coloring unit, configured to set, based on the coordinate parameter and the material parameter, a color of each pixel of the target object when the target object is fused into the panoramic video, to obtain a colored target object; and a target object fusing unit, configured to fuse the colored target object into the panoramic video.

In some embodiments, the panoramic video playing unit includes: an acquiring module, configured to acquire sequence frames of the panoramic video; a mapping module, configured to map the sequence frames to an inner surface of a preset panoramic video playing model; and a projecting module, configured to project a portion of the panoramic video playing model corresponding to a viewing interface onto a projection surface to play the panoramic video.

In some embodiments, the target object coloring unit includes: a two-dimensional coordinate determining module, configured to determine, based on the coordinate parameter, two-dimensional coordinates corresponding to the target object projected to the projection surface; a reflection coefficient determining module, configured to determine, based on the material parameter, a reflection coefficient of the target object for light; and a pixel color determining module, configured to determine the color of the each pixel of the target object when the target object is fused into the panoramic video, based on the two-dimensional coordinates, the reflection coefficient, and a preset intensity of ambient light and a preset intensity of directional light.

In some embodiments, the reflection coefficient determining module is further configured to: determine the reflection coefficient of the target object for light according to a preset list of correspondence between material parameters and reflection coefficients and the material parameter.

In some embodiments, the pixel color determining module is further configured to: determine, based on the two-dimensional coordinates, a coordinate of the each pixel of the target object when the target object is fused into the panoramic video; determine an illumination intensity on the each pixel of the target object when the target object is fused into the panoramic video, based on the coordinate of the each pixel, the reflection coefficient and the preset intensity of ambient light and the preset intensity of directional light; and determine the color of the each pixel based on the illumination intensity on the each pixel.

In some embodiments, the target object fusing unit includes: a position coordinate acquiring module, configured to acquire position coordinates of the target object in the panoramic video; a target object processing module, configured to process the colored target object, the processing including at least one of: scaling, translating, or rotating; and a target object positioning module, configured to position the processed target object based on the position coordinates.

In some embodiments, the apparatus further includes: an interaction unit, the interaction unit includes: a sensor data acquiring module, configured to acquire sensor data of the panoramic video player; an intersection state determining module, configured to determine, based on the sensor data, whether the orientation of the panoramic video player intersects with the position coordinates; an intersection time determining module, configured to count, in response to the orientation of the panoramic video player intersecting with the position coordinates, a duration of the intersecting; and an interactive interface display module, configured to display a preset interactive interface when the duration is greater than a preset threshold.

According to a third aspect, some embodiments of the present disclosure provide a terminal device, including: one or more processors; and a storage apparatus, configured to store one or more programs, where the one or more programs, when executed by the one or more processors, cause the one or more processors to implement the method according to any one of the above embodiments.

According to a fourth aspect, some embodiments of the present disclosure provide a computer-readable storage medium, storing a computer program thereon, the program, when executed by a processor, causes the processor to implement the method according to any one of the above embodiments.

According to the method and apparatus for fusing an object into a panoramic video according to the above embodiments of the present disclosure, when a panoramic video is played in a panoramic video player, a target object is acquired, then the acquired target object is parsed to obtain a coordinate parameter and a material parameter of the target object, the color of each pixel of the target object when the target object is fused in the panoramic video is set according to the coordinate parameter and the material parameter to obtain a colored target object, and the colored target object is finally fused into the panoramic video. The method and apparatus of the embodiments can not only play the content of the panoramic video, but also can fuse a target object well into the played panoramic video, thereby increasing the special effect of the panoramic video.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
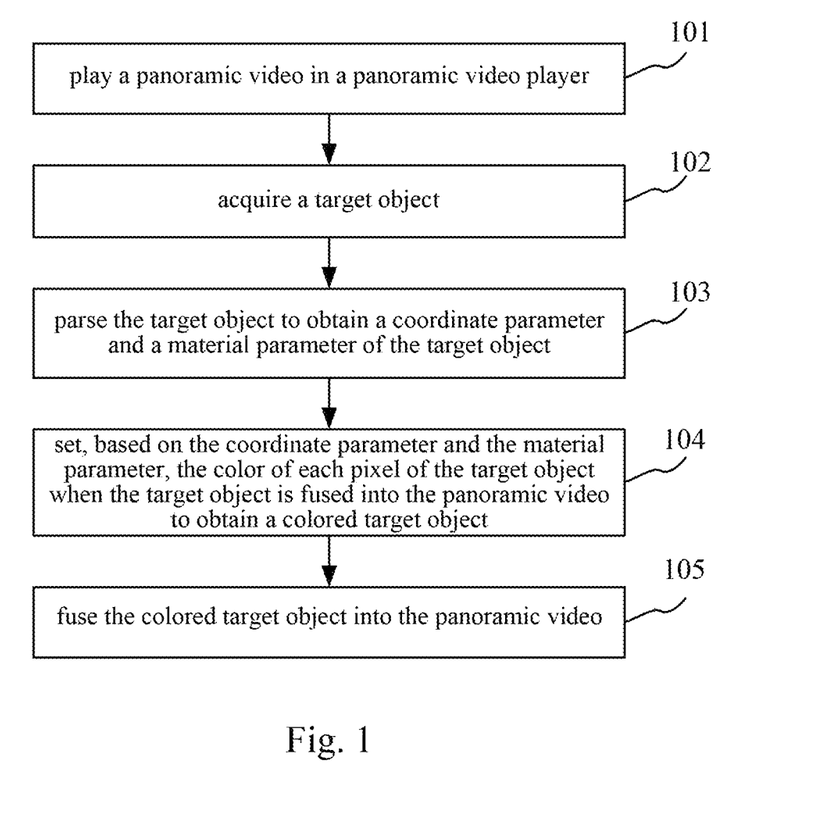
FIG. 1 is a flowchart of a method for fusing an object into a panoramic video according to an embodiment of the present disclosure.

FIG. 1 shows a flow 200 of a method for fusing an object into a panoramic video according to an embodiment of the present disclosure. The method for fusing an object into a panoramic video according to the present embodiment includes the following steps.

Step 101: playing a panoramic video in a panoramic video player.

In the present embodiment, an electronic device (for example, a terminal device) the method for fusing an object into a panoramic video runs thereon may play the panoramic video. Specifically, the terminal device may be installed with an application for playing the panoramic video, such as various panoramic video players.

In some alternative implementations of the present embodiment, step 101 may be implemented by the following steps not shown in FIG. 1:

acquiring sequence frames of the panoramic video;

mapping the sequence frames to an inner surface of a preset panoramic video playing model; and projecting the portion of the panoramic video playing model corresponding to a viewing interface onto a projection surface, to play the panoramic video.

Each frame of the panoramic video is a 360-degree panoramic image, and the panoramic video includes a plurality of 360-degree panoramic images. The sequence frames are mapped to the inner surface of the preset panoramic video playing model, where the panoramic video playing model may be established according to the characteristics of the panoramic video, and is a virtual model such as a sphere model, a cube model, or a pyramid model. Taking the sphere model as an example, the model includes a 360-degree total space centered on the center of the sphere, and projecting the panoramic image to the inner surface of the sphere model is equivalent to viewing the panoramic image by human eyes in the center of a sphere. Then, the portion of the panoramic video playing model corresponding to the viewing interface is projected onto the projection surface, to play the panoramic video. Taking the eye of a viewer as the center of the panoramic video playing model, by using the rule of perspective projection, the panoramic image mapped to the surface of the panoramic video playing model within a projection region may be projected onto an imaging projection surface, and the video/image on the projection surface is finally displayed on a screen of the panoramic video player.

Step 102: acquiring a target object.

In the present embodiment, the target object may be various objects to be fused into the panoramic video, such as animated expressions, text symbols, or various items for promotion. The format of the target object may be various formats that can be fused into the panoramic video, such as an obj format. The terminal device may acquire the target object by various wired or wireless connections. For example, the terminal device may acquire a target object stored locally or a target object input by the user in various ways.

It should be pointed out that the wireless connections may include, but are not limited to, 3G/4G connection, WiFi connection, Bluetooth connection, WiMAX connection, Zigbee connection, UWB (ultra wideband) connection, and other wireless connections now known or developed in the future.

Step 103: parsing the target object, to obtain a coordinate parameter and a material parameter of the target object.

After the target object is acquired, the terminal device may parse the target object to determine a coordinate parameter and a material parameter of the target object. The coordinate parameters may include vertex coordinates of the target object, normal coordinates of each vertex, and the like, and the material parameter may include a parameter of each face of the target object and a parameter of the material of each face.

Step 104: setting, based on the coordinate parameter and the material parameter, a color of each pixel of the target object when the target object is fused into the panoramic video, to obtain a colored target object.

After determining the coordinate parameter and the material parameter of the target object, the terminal device may color the target object, that is, set a color for each pixel of the target object when the target object is fused into the panoramic video, to obtain a colored target object.

Step 105: fusing the colored target object into the panoramic video.

After the target object is colored, the colored target object may be fused into the panoramic video, so that the fusion of other object during the play of the panoramic video is achieved.

Figure 2:
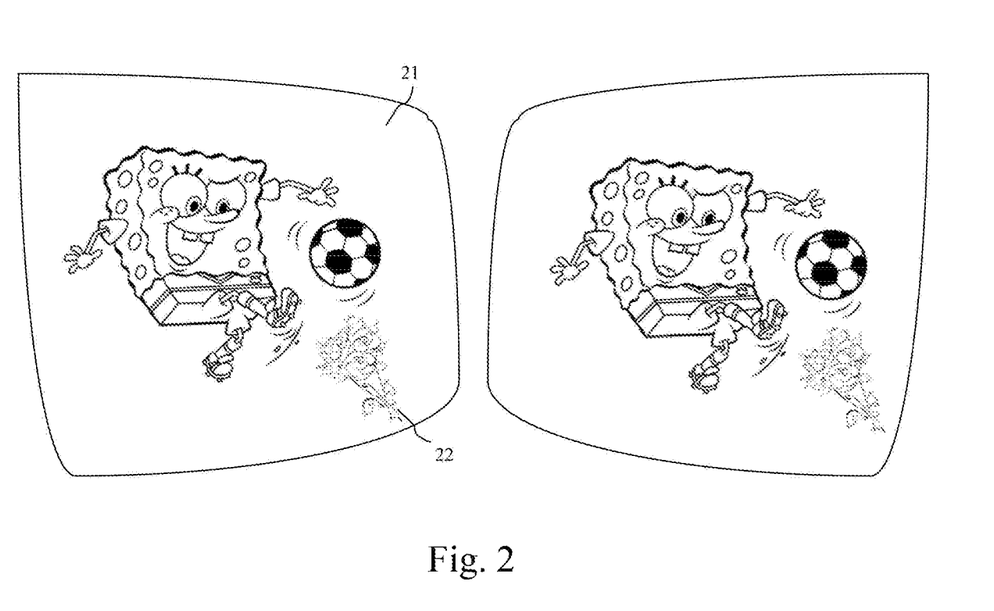
FIG. 2 is a schematic diagram of an application scenario of the method for fusing an object into a panoramic video according to an embodiment of the present disclosure.

Further, referring to FIG. 2, which is a schematic diagram of an application scenario of the method for fusing an object into a panoramic video according to the present embodiment. In the application scenario of FIG. 2, a panoramic video 21 is played in a panoramic video player. During the play, a target object is acquired and parsed, the color of the target object 22 is set to obtain a colored target object, and then the colored target object 22 is fused into the panoramic video 21.

In the method for fusing an object into a panoramic video according to the embodiment of the present disclosure, when a panoramic video is played in a panoramic video player, a target object is acquired, then the acquired target object is parsed to obtain a coordinate parameter and a material parameter of the target object, the color of each pixel of the target object when the target object is fused in the panoramic video is set according to the coordinate parameter and the material parameter to obtain a colored target object, and the colored target object is finally fused into the panoramic video. The method of the present embodiment can not only play the content of the panoramic video, but also can fuse a target object well into the played panoramic video, thereby increasing the special effect of the panoramic video.

In some alternative implementations of the present embodiment, step 105 may be specifically implemented by the following steps not shown in FIG. 1: acquiring position coordinates of the target object in the panoramic video; processing the colored target object, the processing including at least one of the following: scaling, translating, or rotating; and positioning the processed target object based on the position coordinates.

In this implementation, the terminal device may first acquire the position coordinates of the target object in the panoramic video, then process the colored target object, for example, scale, translate, or rotate, and position the processed target object at the position coordinates. In this way, a viewer can view the target object from any angle.

In some alternative implementations of the present embodiment, the method may further the following steps not shown in FIG. 1:

acquiring sensor data of the panoramic video player; determining, based on the sensor data, whether the orientation of the panoramic video player intersects with the position coordinates; counting, in response to the orientation of the panoramic video player intersecting with the position coordinates, a duration of the intersecting; and displaying a preset interactive interface when the duration is greater than a preset threshold.

In this implementation, the orientation of the panoramic video player may be determined based on the sensor data of the panoramic video player. Then, whether the orientation intersects with the position coordinates of the target object is determined. If the orientation intersects with the position coordinates of the target object, the duration of the orientation of the panoramic video player intersecting with the position coordinates of the target object is counted. When the duration is greater than the preset threshold, the preset interactive interface is displayed. When the target object is an article to be promoted, the interactive interface may include information of the article, a button for deleting the target object, a button for adding the target object to a shopping cart, etc., so as to realize the interaction between the viewer and the target object. In this implementation, the orientation of the panoramic video player may be interpreted as the direction at which the viewer's eyes views, that is, the viewer can interact with the target object through long gaze according to this implementation.

Figure 3:
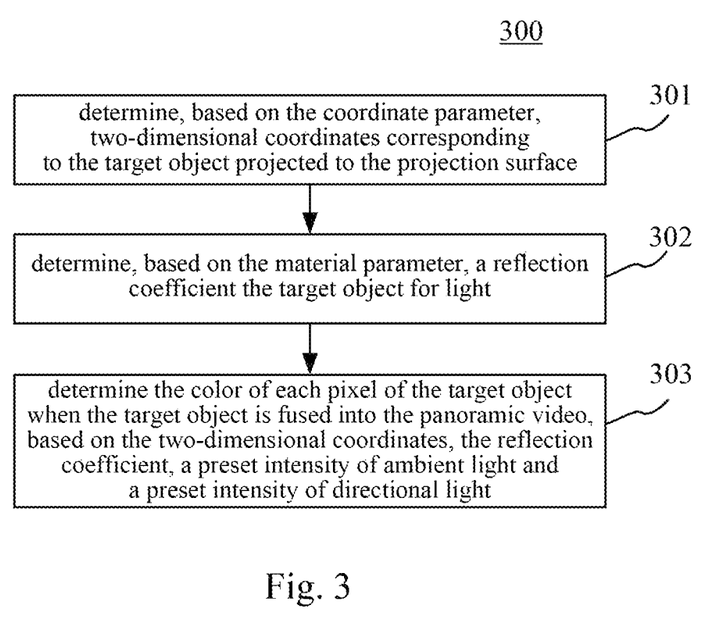
FIG. 3 is a flowchart of an embodiment of coloring a target object in the method for fusing an object into a panoramic video.

Further referring to FIG. 3, a flow 300 of an embodiment of coloring a target object in the method for fusing an object into a panoramic video. As shown in FIG. 3, in the present embodiment, the target object may be colored according to the following steps:

Step 301: determining, based on the coordinate parameter, two-dimensional coordinates corresponding to the target object projected onto the projection surface.

In the present embodiment, the two-dimensional coordinates corresponding to the part covered by the target object when the target object is projected to the projection surface can be determined based on the coordinate parameter (such as vertex coordinates and normal coordinate) of the target object. It can be understood that the two-dimensional coordinates may include a plurality of coordinates, and the plurality of coordinates are used to represent the part on the projection surface covered by the target object.

Step 302: determining, based on the material parameter, a reflection coefficient of the target object for light.

The reflection of the object for light includes specular reflection and diffuse reflection. The coefficient of specular reflection is greater than that of diffuse reflection. The diffuse reflection usually occurs when light is irradiated on a rough object surface, and different materials have different reflection coefficients when the diffuse reflection occurs. In the present embodiment, the terminal device may determine, based on the material parameter, the reflection coefficient of the target object for light.

In some alternative implementations of the present embodiment, the terminal device may determine the reflection coefficient of the target object for light according to a preset list of correspondence between material parameters and reflection coefficients and the material parameter of the target object.

In this implementation, the terminal device may first acquire a list including corresponding relationships between material parameters and reflection coefficients, and then determine the reflection coefficient of the target object for light according to the list and the material parameter of the target object.

Step 303: determining the color of each pixel of the target object when the target object is fused into the panoramic video, based on the two-dimensional coordinates, the reflection coefficient, a preset intensity of ambient light and a preset intensity of directional light.

After the two-dimensional coordinates of the target object on the projection surface and the reflection coefficient of the target object for light are determined, the color of each pixel of the target object when the target object is fused into the panoramic video can be determined based on the preset intensities of ambient light and directional light. The ambient light refers to light in the environment where the target object is located, and the directional light refers to parallel lights from a certain direction. Since the intensity of the ambient light and the intensity of the directional light are preset, the color of each pixel of the target object when the target object is fused into the panoramic video can be determined.

In some alternative implementations of the present embodiment, step 303 may be implemented according to the following steps not shown in FIG. 3: determining, based on the two-dimensional coordinates, a coordinate of each pixel of the target object when the target object is fused into the panoramic video; determining an illumination intensity on each pixel of the target object when the target object is fused into the panoramic video, based on the coordinate of the each pixel, the reflection coefficient and the preset intensities of ambient light and directional light; and determining the color of the each pixel based on the illumination intensity on the each pixel.

In this implementation, the coordinates of each pixel of the target object when the target object is fused into the panoramic video may be determined based on the two-dimensional coordinates, then the illumination intensity of ambient light and directional light on each pixel are determined based on the coordinates of each pixel, the reflection coefficient and the preset intensities of ambient light and directional light, and the color of each pixel is finally determined according to the illumination intensity on each pixel.

The method for fusing an object into a panoramic video according to the embodiment of the present disclosure can color the target object, so that the panoramic video fused with the target object is not obtrusive, and the viewing experience of the viewer is improved.

Figure 4:
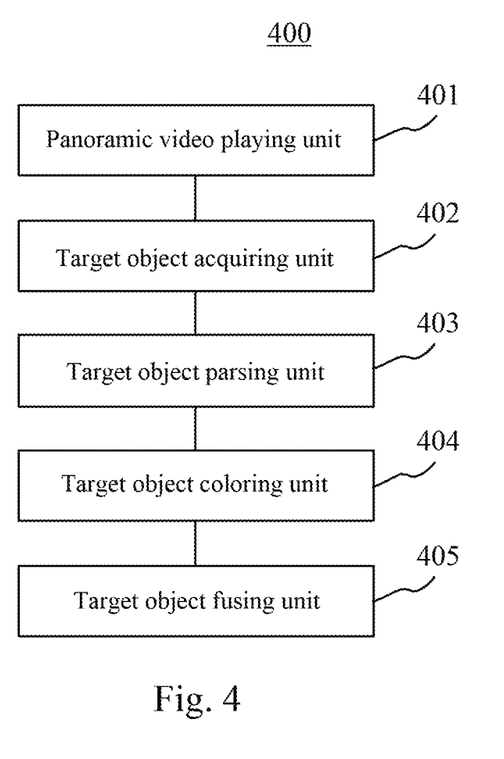
FIG. 4 is a schematic structural diagram of an apparatus for fusing an object into a panoramic video according to an embodiment of the present disclosure.

Further referring to FIG. 4, as an implementation of the method shown in the above figures, an embodiment of the present disclosure provides an apparatus for fusing an object into a panoramic video. The embodiment of the apparatus corresponds to the embodiment of the method shown in FIG. 1, and the apparatus may be applied to various electronic devices.

As shown in FIG. 4, the apparatus 400 for fusing an object in a panoramic video according to the present embodiment includes a panoramic video playing unit 401, a target object acquiring unit 402, a target object parsing unit 403, a target object coloring unit 404, and a target object fusing unit 405.

The panoramic video playing unit 401 is configured to play a panoramic video in a panoramic video player.

The target object acquiring unit 402 is configured to acquire a target object.

The target object parsing unit 403 is configured to parse the target object to obtain a coordinate parameter and a material parameter of the target object.

The target object coloring unit 404 is configured to set, based on the coordinate parameter and the material parameter, the color of each pixel of the target object when the target object is fused into the panoramic video, to obtain a colored target object.

The target object fusing unit 405 is configured to fuse the colored target object into the panoramic video.

In some alternative implementations of the present embodiment, the panoramic video playing unit 401 may further include an acquiring module, a mapping module, and a projecting module not shown in FIG. 4.

The acquiring module is configured to acquire sequence frames of the panoramic video.

The mapping module is configured to map the sequence frames to an inner surface of a preset panoramic video playing model.

The projecting module is configured to project the portion of the panoramic video playing model corresponding to a viewing interface onto a projection surface to play the panoramic video In some alternative implementations of the present embodiment, the target object coloring unit 404 may further include a two-dimensional coordinate determining module, a reflection coefficient determining module, and a pixel color determining module not shown in FIG. 4.

The two-dimensional coordinate determining module is configured to determine, based on the coordinate parameter, two-dimensional coordinates corresponding to the target object projected to the projection surface.

The reflection coefficient determining module is configured to determine, based on the material parameter, a reflection coefficient of the target object for light.

The pixel color determining module is configured to determine the color of each pixel of the target object when the target object is fused into the panoramic video, based on the two-dimensional coordinates, the reflection coefficient, and a preset intensity of ambient light and a preset intensity of directional light.

In some alternative implementations of the present embodiment, the reflection coefficient determining module may be further configured to determine the reflection coefficient of the target object for light according to a preset list of correspondence between material parameters and reflection coefficients and the material parameter.

In some alternative implementations of the present embodiment, the pixel color determining module is further configured to: determine, based on the two-dimensional coordinates, a coordinate of the each pixel of the target object when the target object is fused into the panoramic video; determine an illumination intensity on each pixel of the target object when the target object is fused into the panoramic video, based on the coordinate of the each pixel, the reflection coefficient and the preset intensity of ambient light and the preset intensity of directional light; and determine the color of each pixel of the target object based on the illumination intensity on each pixel.

In some alternative implementations of the present embodiment, the target object fusing unit 405 may further include a position coordinate acquiring module, a target object processing module, and a target object positioning module not shown in FIG. 4.

The position coordinate acquiring module is configured to acquire position coordinates of the target object in the panoramic video.

The target object processing module is configured to process the colored target object according to at least one of the following: scaling, translating, or rotating.

The target object positioning module is configured to position the processed target object based on the position coordinates.

In some alternative implementations of the present embodiment, the apparatus further includes an interaction unit not shown in FIG. 4. The interaction unit may include a sensor data acquiring module, an intersection state determining module, an intersection time determining module, and an interactive interface display module.

The sensor data acquiring module is configured to acquire sensor data of the panoramic video player.

The intersection state determining module is configured to determine, based on the sensor data, whether the orientation of the panoramic video player intersects with the position coordinates.

The intersection time determining module is configured to count, in response to the orientation of the panoramic video player intersecting with the position coordinates, a duration of the intersecting.

The interactive interface display module is configured to display a preset interactive interface when the duration is greater than a preset threshold.

In the apparatus for fusing an object into a panoramic video according to the embodiment of the present disclosure, when a panoramic video is played in a panoramic video player, a target object is acquired, then the acquired target object is parsed to obtain a coordinate parameter and a material parameter of the target object, the color of each pixel of the target object when the target object is fused into the panoramic video is set according to the coordinate parameter and the material parameter to obtain a colored target object, and the colored target object is finally fused into the panoramic video. The apparatus of the present embodiment can not only play the content of the panoramic video, but also can fuse a target object well into the played panoramic video, thereby increasing the special effect of the panoramic video.

It should be understood that the units 401 to 405 described in the apparatus 400 for fusing an object into a panoramic video respectively correspond to the steps in the method described with reference to FIG. 1. Therefore, the operations and characteristics described above for the method for fusing an object into a panoramic video are also applicable to the apparatus 400 and the units included therein, and details are not described herein again. The corresponding units of the apparatus 400 may cooperate with the units in a terminal device to implement the solution of the embodiment of the present disclosure.

Figure 5:
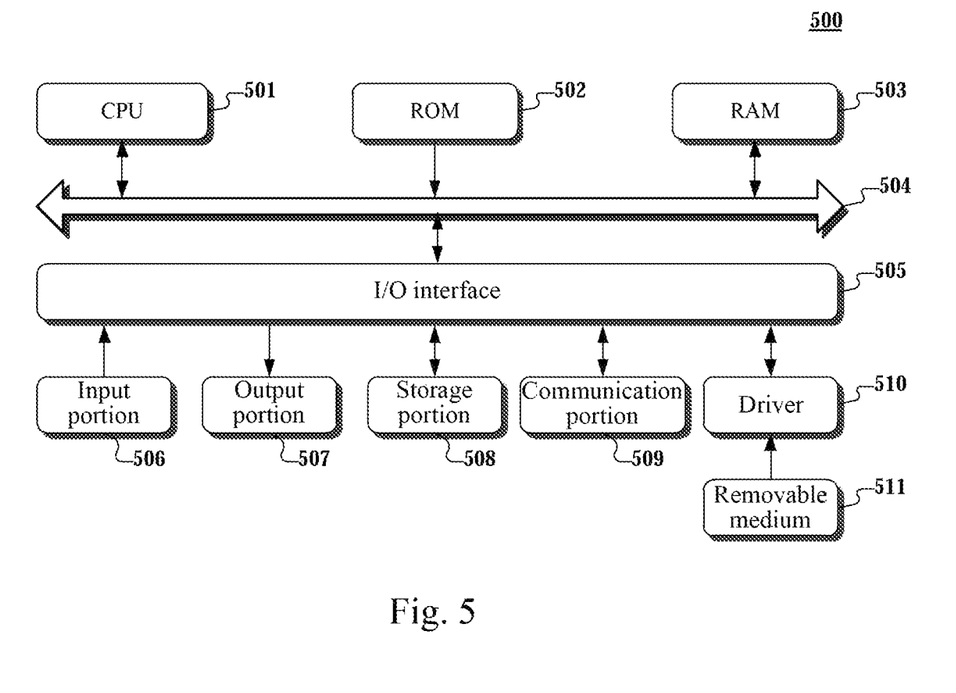
FIG. 5 is a schematic structural diagram of a computer system adapted to implement a terminal device of embodiments of the present disclosure.

Referring to FIG. 5, a schematic structural diagram of a computer system 500 adapted to implement a terminal device of some embodiments of the present disclosure is shown. The terminal device shown in FIG. 5 is only an example and should not bring any limitation on the functions and scopes of usage of the embodiments of the present disclosure.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to some embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 509, or may be installed from the removable medium 511. The computer program, when executed by the central processing unit (CPU) 501, implements the above mentioned functionalities as defined by the methods of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a panoramic video playing unit, a target object acquiring unit, a target object parsing unit, and a target object coloring unit, where the names of these units or modules do not in some cases constitute a limitation to such units or modules themselves. For example, the target object acquiring unit may also be described as "a unit for acquiring a target object."

In another aspect, some embodiment of the present disclosure further provide a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: play a panoramic video in a panoramic video player; acquire a target object; parse the target object to obtain a coordinate parameter and a material parameter of the target object; set, based on the coordinate parameter and the material parameter, a color of each pixel of the target object when the target object is fused into the panoramic video, to obtain a colored target object; and fuse the colored target object into the panoramic video.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for fusing an object into a panoramic video, comprising:
    playing a panoramic video in a panoramic video player;
    acquiring a target object;
    parsing the target object, to obtain a coordinate parameter and a material parameter of the target object;
    setting, based on the coordinate parameter and the material parameter, a color of each pixel of the target object when the target object is fused into the panoramic video, to obtain a colored target object; and
    fusing the colored target object into the panoramic video.

2. The method according to claim 1, wherein the playing a panoramic video in a panoramic video player comprises:
    acquiring sequence frames of the panoramic video;
    mapping the sequence frames to an inner surface of a preset panoramic video playing model; and
    projecting a portion of the preset panoramic video playing model corresponding to a viewing interface onto a projection surface, to play the panoramic video.

3. The method according to claim 2, wherein the setting, based on the coordinate parameter and the material parameter, the color of each pixel of the target object when the target object is fused into the panoramic video, to obtain the colored target object comprises:

determining, based on the coordinate parameter, two-dimensional coordinates corresponding to the target object when the target object is projected onto the projection surface;

determining, based on the material parameter, a reflection coefficient of the target object for light; and determining the color of the each pixel of the target object when the target object is fused into the panoramic video, based on the two-dimensional coordinates, the reflection coefficient, a preset intensity of ambient light and a preset intensity of directional light.

4. The method according to claim 3, wherein the determining, based on the material parameter, a reflection coefficient for light of the target object comprises:

determining the reflection coefficient of the target object for light according to a preset list of correspondence between material parameters and reflection coefficients and the material parameter.

5. The method according to claim 3, wherein the determining the color of each pixel of the target object when the target object is fused into the panoramic video, based on the two-dimensional coordinates, the reflection coefficient, the preset intensity of ambient light and the preset intensity of directional light comprises:

determining, based on the two-dimensional coordinates, a coordinate of the each pixel of the target object when the target object is fused into the panoramic video;

determining an illumination intensity on the each pixel of the target object when the target object is fused into the panoramic video, based on the coordinate of the each pixel, the reflection coefficient and the preset intensity of ambient light and the preset intensity of directional light; and determining the color of the each pixel based on the illumination intensity on the each pixel.

6. The method according to claim 1, wherein the fusing the colored target object into the panoramic video comprises:

acquiring position coordinates of the target object in the panoramic video;

processing the colored target object, the processing including at least one of: scaling, translating, or rotating; and positioning the processed target object based on the position coordinates.

7. The method according to claim 6, further comprising:
acquiring sensor data of the panoramic video player;
determining, based on the sensor data, whether an orientation of the panoramic video player intersects with the position coordinates;
counting, in response to the orientation of the panoramic video player intersecting with the position coordinates, a duration of the intersecting; and
displaying a preset interactive interface when the duration is greater than a preset threshold.

8. An apparatus for fusing an object into a panoramic video, comprising:
at least one processor; and
a memory storing instructions, the instructions when executed by the at least one processor, cause the at least one processor to perform operations, the operations comprising:
playing a panoramic video in a panoramic video player;
acquiring a target object;
parsing the target object to obtain a coordinate parameter and a material parameter of the target object;

setting, based on the coordinate parameter and the material parameter, a color of each pixel of the target object when the target object is fused into the panoramic video, to obtain a colored target object; and
fusing the colored target object into the panoramic video.

9. The apparatus according to claim 8, wherein the playing a panoramic video in a panoramic video player comprises:
acquiring sequence frames of the panoramic video;
mapping the sequence frames to an inner surface of a preset panoramic video playing model; and
projecting a portion of the preset panoramic video playing model corresponding to a viewing interface onto a projection surface to play the panoramic video.

10. The apparatus according to claim 9, wherein the setting, based on the coordinate parameter and the material parameter, the color of each pixel of the target object when the target object is fused into the panoramic video, to obtain the colored target object comprises:

determining, based on the coordinate parameter, two-dimensional coordinates corresponding to the target object when the target object is projected to the projection surface;

determining, based on the material parameter, a reflection coefficient of the target object for light; and determining the color of the each pixel of the target object when the target object is fused into the panoramic video, based on the two-dimensional coordinates, the reflection coefficient, a preset intensity of ambient light and a preset intensity of directional light.

11. The apparatus according to claim 10, wherein the determining, based on the material parameter, a reflection coefficient for light of the target object comprises:

determining the reflection coefficient of the target object for light according to a preset list of correspondence between material parameters and reflection coefficients and the material parameter.

12. The apparatus according to claim 10, wherein the determining the color of each pixel of the target object when the target object is fused into the panoramic video, based on the two-dimensional coordinates, the reflection coefficient, the preset intensity of ambient light and the preset intensity of directional light comprises:

determining, based on the two-dimensional coordinates, a coordinate of the each pixel of the target object when the target object is fused into the panoramic video;

determining an illumination intensity on the each pixel of the target object when the target object is fused into the panoramic video, based on the coordinate of the each pixel, the reflection coefficient and the preset intensity of ambient light and the preset intensity of directional light; and determining the color of the each pixel based on the illumination intensity on the each pixel.

13. The apparatus according to claim 8, wherein the fusing the colored target object into the panoramic video comprises:

acquiring position coordinates of the target object in the panoramic video;

processing the colored target object, the processing including at least one of: scaling, translating, or rotating; and positioning the processed target object based on the position coordinates.

14. The apparatus according to claim 13, further comprising:

acquiring sensor data of the panoramic video player;
determining, based on the sensor data, whether an the orientation of the panoramic video player intersects with the position coordinates;
counting, in response to the orientation of the panoramic video player intersecting with the position coordinates, a duration of the intersecting; and
displaying a preset interactive interface when the duration is greater than a preset threshold.

15. A non-transitory computer-readable storage medium, storing a computer program thereon, the program, when executed by a processor, causes the processor to implement operations, the operations comprising:
playing a panoramic video in a panoramic video player;
acquiring a target object;
parsing the target object, to obtain a coordinate parameter and a material parameter of the target object;
setting, based on the coordinate parameter and the material parameter, a color of each pixel of the target object when the target object is fused into the panoramic video, to obtain a colored target object; and
fusing the colored target object into the panoramic video.

16. The medium according to claim 15, wherein the playing a panoramic video in a panoramic video player comprises:
acquiring sequence frames of the panoramic video;
mapping the sequence frames to an inner surface of a preset panoramic video playing model; and
projecting a portion of the preset panoramic video playing model corresponding to a viewing interface onto a projection surface, to play the panoramic video.

17. The medium according to claim 16, wherein the setting, based on the coordinate parameter and the material parameter, the color of each pixel of the target object when the target object is fused into the panoramic video, to obtain the colored target object comprises:

determining, based on the coordinate parameter, two-dimensional coordinates corresponding to the target object when the target object is projected onto the projection surface;
determining, based on the material parameter, a reflection coefficient of the target object for light; and
determining the color of the each pixel of the target object when the target object is fused into the panoramic video, based on the two-dimensional coordinates, the reflection coefficient, a preset intensity of ambient light and a preset intensity of directional light.

18. The medium according to claim 17, wherein the determining, based on the material parameter, a reflection coefficient for light of the target object comprises:
determining the reflection coefficient of the target object for light according to a preset list of correspondence between material parameters and reflection coefficients and the material parameter.

19. The medium according to claim 17, wherein the determining the color of each pixel of the target object when the target object is fused into the panoramic video, based on the two-dimensional coordinates, the reflection coefficient, the preset intensity of ambient light and the preset intensity of directional light comprises:
determining, based on the two-dimensional coordinates, a coordinate of the each pixel of the target object when the target object is fused into the panoramic video;
determining an illumination intensity on the each pixel of the target object when the target object is fused into the panoramic video, based on the coordinate of the each pixel, the reflection coefficient and the preset intensity of ambient light and the preset intensity of directional light; and
determining the color of the each pixel based on the illumination intensity on the each pixel.

* * * * *

UNITED STATES PATENT AND TRADEMARK OFFICE
CERTIFICATE OF CORRECTION

PATENT NO. : 11,188,801 B2  
APPLICATION NO. : 16/628132  
DATED : November 30, 2021  
INVENTOR(S) : Jinping He et al.

Page 1 of 1

It is certified that error appears in the above-identified patent and that said Letters Patent is hereby corrected as shown below:

On the Title Page

Item [56], delete "Seo" and insert --Seo et al.--, therefor.

In the Claims

Column 15, Line 2, Claim 14, delete "an the" and insert --an--, therefor.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*